United States Patent [19]

Tanaka et al.

[11] 4,322,046
[45] Mar. 30, 1982

[54] SEAT BELT RETRACTOR

[75] Inventors: Katsuyuki Tanaka, Okazaki; Satosi Kuwakado, Aichi; Noboru Tsuge, Kariya; Toshiaki Shimogawa, Aichi, all of Japan

[73] Assignee: Nippon Soken, Inc., Nishio, Japan

[21] Appl. No.: 196,567

[22] Filed: Oct. 14, 1980

[30] Foreign Application Priority Data

Oct. 16, 1979 [JP] Japan ................. 54-142891[U]

[51] Int. Cl.³ ............................................. A62B 35/02
[52] U.S. Cl. ............................. 242/107.4 A; 280/805; 297/472
[58] Field of Search ............... 242/107.4 R–107.4 E; 280/801–808; 297/471, 472, 474–480

[56] References Cited

U.S. PATENT DOCUMENTS

| | | | |
|---|---|---|---|
| 3,632,060 | 1/1972 | Balder | 280/805 X |
| 3,715,144 | 2/1973 | Minolla | 297/472 |
| 3,790,099 | 2/1974 | Beller | 242/107.4 R |
| 3,857,528 | 12/1974 | Fiala | 242/107.4 R |
| 3,952,967 | 4/1976 | Barile et al. | 242/107.4 R |
| 3,970,265 | 7/1976 | Kopke et al. | 242/107.4 B X |

FOREIGN PATENT DOCUMENTS 2313348 10/1973 Fed. Rep. of Germany ...... 297/472

Primary Examiner—John M. Jillions
Attorney, Agent, or Firm—Cushman, Darby & Cushman

[57] ABSTRACT

A seat belt retractor to be installed in a seat belt system of a vehicle for restraining an occupant on his seat by a seat belt in an emergency, comprises a reel, a torsion bar, one end of which is connected to the reel so as to be rotated therewith, the other end of which is formed into a locking portion, a lock member to be engaged with the locking portion for locking the other end of the torsion bar in an emergency and a stopper means which is disposed between the reel and the torsion bar for stopping the rotation of the reel. In an emergency such as upon an impact of the vehicle, the lock member operates to lock the other end of the torsion bar. The torsion bar of which one end is connected to the rotating reel is twisted to absorb the impact energy of an occupant. And before the torsion bar is broken, the stopper means operates to stop the rotation of the reel. Therefore, even if a large tension force is applied to the seat belt, the torsion bar is not broken due to the twisting thereof.

6 Claims, 5 Drawing Figures

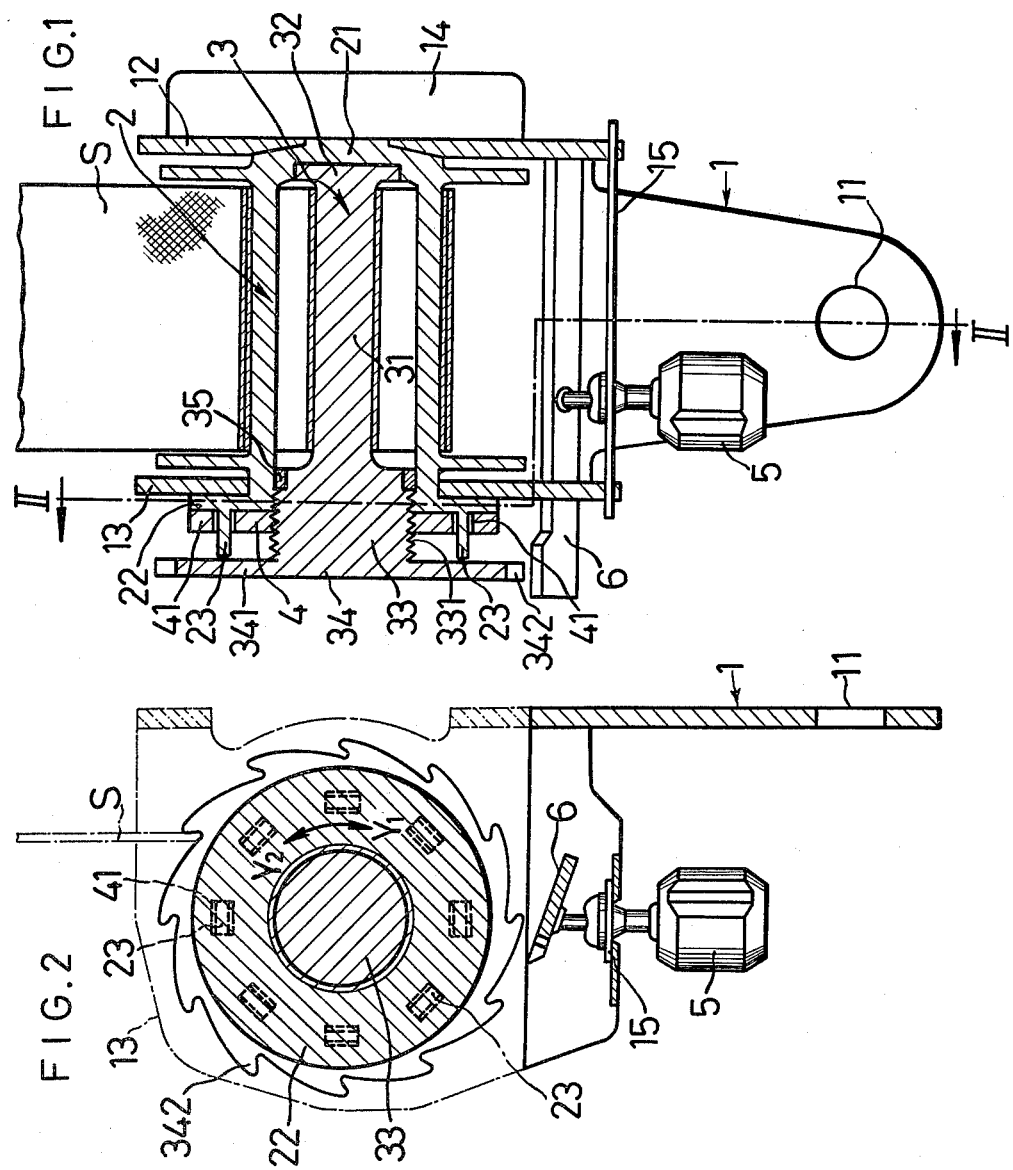

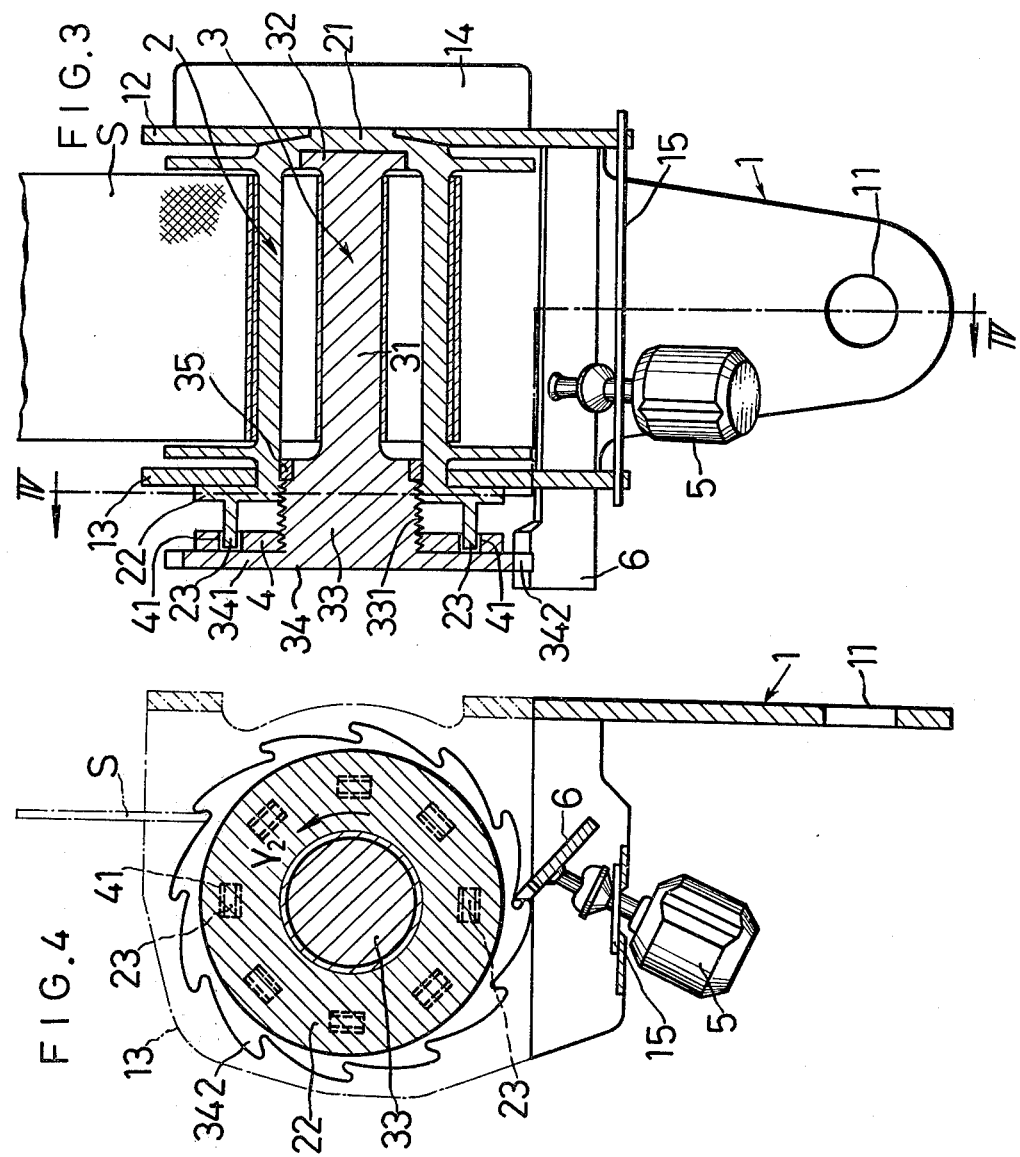

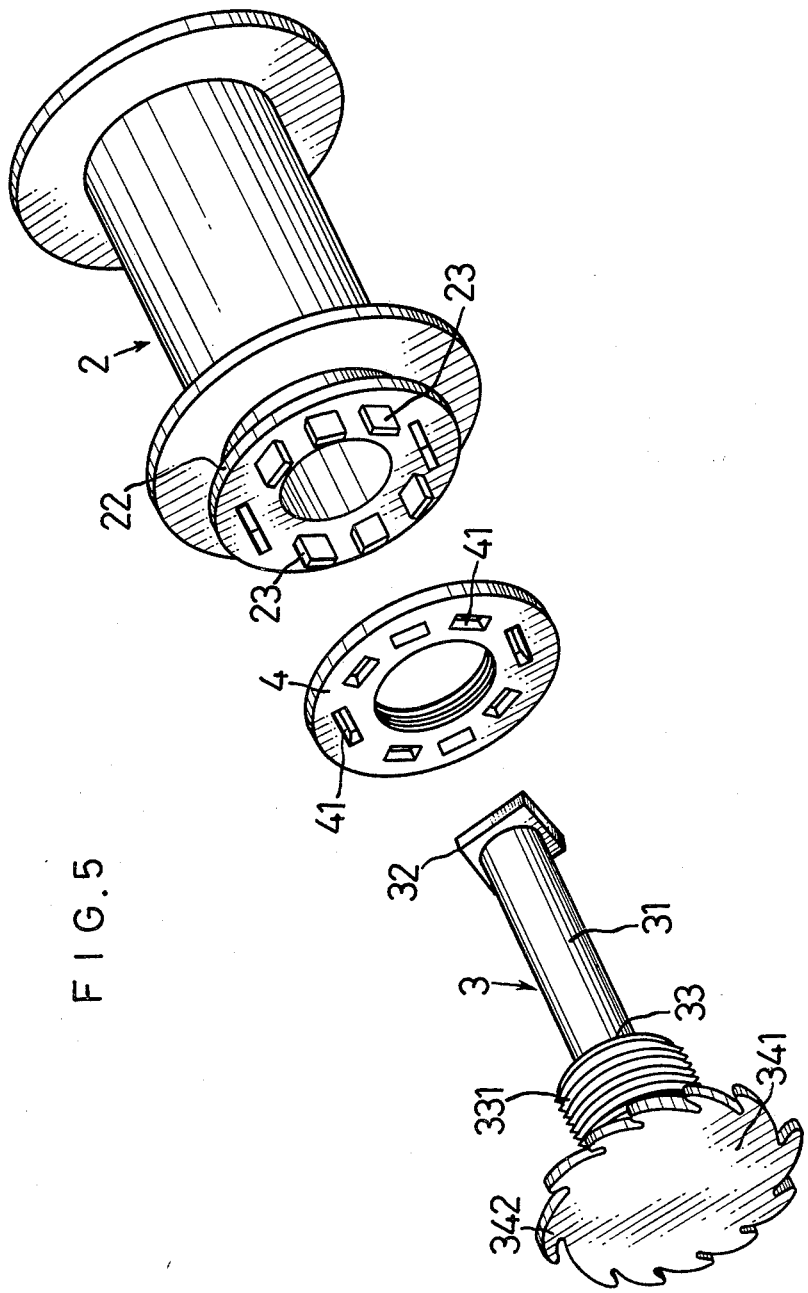

SEAT BELT RETRACTOR

BACKGROUND OF THE INVENTION

The present invention relates to a seat belt retractor for a vehicle or the like, particularly to a seat belt retractor provided with a torsion bar connected to a seat belt.

In the conventional seat belt retractor provided with a torsion bar, a sleeve is integrally connected to one end of the torsion bar and a seat belt is wound round the sleeve. And between the other end of the torsion bar and a fixed member of the retractor such as a holder block, a catch is provided for usually allowing the rotation of the torsion bar and locking the other end of the torsion bar only in an emergency such as upon an impact of the vehicle.

The seat belt is usually withdrawn from or wound up due to the rotation of the sleeve. And in an emergency, the other end of the torsion bar is locked to the fixed member by the catch while one end thereof connected to the sleeve is rotated by the seat belt to which the load of an occupant is applied.

As a result, the torsion bar is twisted to absorb the impact energy of the occupant.

However, in the conventional device as described above, the torsion bar is in danger of being excessively twisted and broken when the vehicle collides against another vehicle or a fixed object at a high speed or the weight of the occupant wearing the seat belt is too large.

If the torsion bar is broken, the occupant is not restricted by the seat belt to be in danger of being injured.

Accordingly, one object of the present invention is to provide an improved and safe seat belt retractor provided with a torsion bar for absorbing the kinetic energy of the occupant in an emergency.

Another object of the present invention is to provide a seat belt retractor provided with a means for preventing the torsion bar from being broken.

DESCRIPTION OF THE DRAWINGS

Other objects and advantages of the invention will become apparent from the following description of embodiments with reference to the accompanying drawings wherein:

FIG. 1 is a partially sectioned front view of the seat belt retractor of the present invention;

FIG. 2 is a sectional view taken along the line II—II of FIG. 1;

FIG. 3 is a partially sectioned front view of the seat belt retractor of the present invention under operation;

FIG. 4 is a sectional view taken along the line IV—IV of FIG. 3; and

FIG. 5 is a fragmentary exploded perspective view of the seat belt retractor of the present invention.

DETAILED DESCRIPTION OF THE INVENTION

In brief, the present invention provides a seat belt retractor comprising a torsion bar of which one end is connected to a reel and is rotated therewith, and of which the other end is locked in an emergency such as upon an impact of a vehicle, and a stopper means including a screw member which moves together with the reel when the reel rotates the torsion bar while twisting due to the tension force of the seat belt and which is stopped after moving by a predetermined distance to prevent the reel from rotating.

According to the seat belt retractor of the present invention, the impact energy of the occupant restrained by the seat belt is absorbed due to the twisting of the torsion bar in an emergency. And the occupant is protected from the secondary impact since the torsion bar is not broken even by a large tension force of the seat belt.

Hereinafter, one embodiment of the present invention will be explained with reference to the drawings.

In FIG. 1, FIG. 2 and FIG. 5, a retractor frame 1 is fixed to a vehicle body by a bolt or the like in a hole 11 provided therein.

In the retractor frame 1, a pair of side walls 12 and 13 opposed to each other are formed and a reel 2 is rotatably supported thereby.

The reel 2 is cylindrical and inside thereof, a torsion bar 3 made of steel such as carbon steel is disposed.

The torsion bar 3 is composed of a bar-shaped twisting portion 31, a connecting portion 32 which is formed in one end of the twisting portion 31 for connecting the twisting portion 31 and the reel 2, a screw portion 33 provided with a screw 331 in the outer periphery thereof, which is formed in the other end of the twisting portion 31 and has a larger diameter than that of the twisting portion 31, and a gear portion 34 provided with a sawteeth-shaped one-way ratchet gear in the outer periphery of a flange-shaped circular plate 341 which is formed in an end portion of the screw portion 33.

The twisting portion 31 is disposed in the internal cavity of the reel 2 coaxially. And the connecting portion 32 having a rectangular head portion is closely inserted into a rectangular hole formed in a wall 21 which is one end of the reel 2.

Therefore, the connecting portion 32 is rotated together with the reel 2.

On the outer periphery of the screw portion 33, a ring 35 is closely fit so as to slide with respect to the reel 2.

In the other end of the reel 2, a flange 22 is formed.

One surface of the flange 22 is slidably contacted with one side surface of the wall 13 of the retractor frame 1 and in the other surface of the flange 22 which opposes to a circular plate-shaped stopping member 341 of the gear portion 34 formed in one end of the torsion bar 3 at a predetermined distance, a plurality of projections 23 having a rectangular section are provided along the periphery thereof at predetermined intervals in parallel with the torsion bar 3.

In the screw portion 33 of the torsion bar 3, an annular screw member 4 provided with a screw in the inner periphery thereof is screwed so as to enable the screw motion. In the screw member 4, rectangular holes 41 are formed so as to be opposed to the projections 23. Within the holes 41, the projections 23 are slidably inserted.

To the twisting portion 31 of the torsion bar 3, one end of the seat belt S is connected.

The seat belt S is wound round the reel 2 and withdrawn therefrom. The withdrawn end of the seat belt S is fixed to an anchor, a buckle or the like (not shown).

In the side surface of the side wall 12 of the retractor frame 1, a case 14 wherein a spring (not shown) is disposed, is provided. And the spring applies a light force in a seat belt retracting direction ($Y_1$ direction in FIG. 2) to the reel 2.

And the seat belt S is withdrawn in accordance with the action of the occupant on his seat ($Y_2$ direction in FIG. 2).

To lower ends of both of the side walls 12 and 13 of the retractor frame 1, a bracket 15 is fixed to support a pendulum 5 in a rockable condition.

And an upper end of the pendulum 5 supports a lock bar 6. Due to the rocking motion of the pendulum 5, the lock bar 6 is inclined so that one side end thereof is lifted up. And one end of the lock bar 6 is engaged with the opposed oneway ratchet gear 342 of the torsion bar 3 to lock the rotation of the one end of the torsion bar 3.

In the seat belt retractor having the above described structure, the torsion bar 3 is usually rotated together with the reel 2 without being locked by the lock bar 6. The seat belt S is withdrawn or wound up in accordance with the action of the occupant. At this time, the reel 2, the torsion bar 3 and the screw member 4 are rotated in a body and they are not relatively moved.

Next, upon an impact of the vehicle, if the deceleration of the vehicle reaches more than a predetermined value, the pendulum 5 is rocked to lift up one side end of the lock bar 6 and the lock bar 6 is engaged with the gear 342 of the torsion bar 3 to block the rotation of the torsion bar 3 in the seat belt withdrawing direction ($Y_2$ direction in FIG. 4) as shown in FIG. 3 and FIG. 4.

And the tension force is applied to the seat belt S due to the forward movement of the occupant occurring upon an impact of the vehicle, and the reel 2 is rotated in a seat belt withdrawing direction.

At this time, when the rotating force of the reel 2 exceeds the stress limit of the twisting portion 31 of the torsion bar 3 of which one end is connected to the reel 2, the reel 2 is rotated, twisting the twisting portion 31 of which one end is locked.

Thus, the impact energy of the passanger is absorbed.

When the reel 2 is rotated, the screw portion 4 of the stopper means, which is coupled with the projections 23 which is provided in one end of the reel 2, is also rotated therewith.

Due to the rotation of the screw member 4, the screw member 4 moves towards the circular plate-shaped stopping member 341, while being engaged with the screw portion 33 which is not rotated, locked by the lock bar 6.

And when the screw member 4 is contacted with the stopping member 341, the rotation of the reel 2 is stopped and the twisting of the torsion bar is also stopped.

As a result, the twisting of the torsion bar is restricted within a predetermined angle so as not to be broken.

Therefore, even if the load of the occupant is excessively applied to the seat belt S, the torsion bar 3 is not twisted so as to be broken.

In the above described embodiment, the screw member 4 of the stopper member is movably screwed in the screw portion 33 of the torsion bar 3.

Other structure as described below can be also employed.

Namely, in the outer periphery of the screw member 4 a screw is formed and in the circular plate-shaped stopping member 341, a boss portion is formed so as to project towards the screw member 4, and a screw is formed in the inner peripheral surface of the boss portion. And the screw of the screw member 4 is engaged with that of the boss portion of the stopping member 341.

And as a means for blocking the movement of the screw member 4, other means than the flange shaped circular plate 341 can be provided in the finishing end of the screw formed in the screw portion 33 of the torsion bar 3.

As the screw member 4, other structure will do if it moves straight by a predetermined distance, rotating together with the reel 2 when one end of the torsion bar 3 is locked.

And as the locking means of the torsion bar 3, other means of pushing up the lock bar 6 by solenoid or of directly engaging the other end of the torsion bar 3 by solenoid, will do.

As described above, according to the seat belt retractor of the present invention, the impact energy of the occupant wearing the seat belt is absorbed by twisting the torsion bar of which one end is connected to the reel and the torsion bar is prevented from being broken by limiting the rotating angle of the reel.

And according to the present invention, the safety of the seat belt retractor can be largely improved.

Having now fully described the invention, it will be apparent to one of ordinary skill in the art that many changes and modifications can be made thereto without departing from the spirit or scope of the invention as set forth herein.

What is claimed is:

1. A seat belt retractor for vehicles comprising:
   a retractor frame fixed to a vehicle body;
   a reel which is rotatably supported by said retractor frame for winding said seat belt;
   a torsion bar, one end of which is connected to said reel so as to be rotated integrally therewith and the other end of which is formed into a locking portion;
   a lock member which is disposed in said retractor frame to be engaged with said locking portion in an emergency for locking said the other end of said torsion bar; and
   a stopper means which is disposed between said reel and said the other end of said torsion bar for engaging said reel with said the other end of said torsion bar to prevent said reel from rotating when the twisting angle of said torsion bar of which one end is rotated integrally with said reel and of which the other end is locked by said lock member, reaches a predetermined value in the emergency.

2. The seat belt retractor according to claim 1, wherein:
   said reel is cylindrical;
   said torsion bar is coaxially disposed within said cylindrical reel and is connected to one end of said reel; and
   said stopper means comprises a screw member which is disposed in the other end of said reel so as to rotate therewith and move towards said the other end of said torsion bar locked by said lock member along said torsion bar, while continuing a screw motion, and a stopping member which is projected from said the other end of said torsion bar so as to be opposed to said screw member for restraining the movement of said screw member.

3. The seat belt retractor according to claim 2, wherein:
   said torsion bar comprises a twisting portion which is accomodated within said cylindrical reel, and a screw portion having a larger diameter than said twisting portion, which is integrally connected to said twisting portion, said screw portion being provided with a screw in the outer periphery thereof; and said screw member of said stopper means is mounted on said screw portion so as to enable the screw motion therewith towards said stopping member, while rotating with said reel.

4. The seat belt retractor according to claim 3, wherein:
said stopping member of said stopper means is a flange shaped circular plate which is coaxially and integrally connected to said screw portion so as to be opposed to said screw member; and
said locking portion is a ratchet gear formed in the outer periphery of said flange shaped circular plate.

5. The seat belt retractor according to claim 4, wherein:
said lock member comprises a pendulum which is rockably disposed in said retractor frame and a lock bar which is supported by said pendulum to be engaged with said ratchet gear in an emergency.

6. The seat belt retractor according to claim 4, wherein:
said screw member is an annular plate which is mounted on said screw portion of said torsion bar so as to be opposed to said reel;
said screw member has a plurality of holes penetrating therethrough along the periphery thereof;
within said holes, a plurality of projections which are integrally formed in said the other end of said reel so as to be opposed to said holes of said screw member, are slidably inserted; and
said projections extends towards said the other end of said torsion bar in parallel with said torsion bar to the neighbourhood of said flange shaped circular plate.

* * * * *